Patented Apr. 30, 1940

2,199,193

UNITED STATES PATENT OFFICE 2,199,193

WATERPROOFING COMPOUND

Emile L. Baldeschwieler, Cranford, and Peter J. Wiezevich, Elizabeth, N. J.; said Wiezevich, now by judicial change of name to Peter J. Gaylor, assignors to Standard Oil Development Company, a corporation of Delaware No Drawing. Application August 19, 1936, Serial No. 96,782

1 Claim. (Cl. 134—78.5)

This invention relates to a new and improved coating composition that is useful for waterproofing and weatherproofing building materials such as brick, cement, stone, terra-cotta, wood and similar materials.

One of the main objects of this invention is to coat the building materials so that the surfaces are waterproofed and the discoloration resulting by efflorescence of salts dissolved out of the building materials or the cement employed in laying the building materials is prevented.

Further objects of this invention are to provide a stable, enduring coating composition, preferably prepared entirely from petroleum products which will not stain or discolor the building materials while effectively waterproofing and weatherproofing so that resistance to moisture penetration is better over longer periods of time than has been obtained heretofore. Due to the nature of the materials used, fungus growth is prevented and the tendency of the coating to crack after being applied and on standing is eliminated.

The preferred embodiment of the improved coating composition comprises a petroleum waxy material such as paraffin wax or petrolatum. Mixtures of paraffin wax and petrolatum are preferred. In these mixtures, waxes of high melting point, i. e. 130–150° F. are preferred, although lower melting point waxes, e. g. 122° F. melting point have been found to be effective. To this waxy material may also be added ½ to 2% of a linear soluble polymer such as isobutylene polymer having molecular weights above 1000, which is prepared by polymerizing the isobutylene at temperatures below —32° F. in the presence of boron fluoride. Petroleum resins produced by condensation of cracking coil tar by means of aluminum chloride may also be added.

Another ingredient of this coating composition is a petroleum product of a drying nature which is composed substantially of hydrogen and carbon and is highly deficient in hydrogen. This ingredient may be prepared from cracking coil still tar bottoms. Both the bottoms and the distillates may be used for this particular purpose. A typical formula of this petroleum product is as follows:

| | Per cent |
|---|---|
| Carbon | 80.96 |
| Hydrogen | 10.00 |
| Sulfur | 6.18 |

The cracking coil tar oil is a petroleum hydrocarbon compound obtained by cracking gas oil or other similar petroleum oil at temperatures of about 700° to 1200° F. and under pressures of about 100 to 1500 pounds per square inch. The cracking may be made in tubes, tube and tank, or similar apparatus. On cracking the petroleum oil to form lower boiling compounds such as gasoline, there are also formed at the same time heavier or higher boiling hydrocarbon compounds. When gasoline, gas oil and light lubricating oil are distilled from these products formed by cracking there remains a residual oil which will hereafter be known as cracking coil tar. The cracking coil tar may be fractionated further by distilling under vacuum to obtain a residual tar of about 9° to 12.5 A. P. I. gravity and a distillate having the following physical characteristics:

| | |
|---|---|
| Gravity | 10.4 to 12.5 A. P. I. |
| Flash | 415° to 330° F. |
| Fire | 480° to 395° F. |
| Viscosity at 100° F. | 2658 to 155 seconds. |
| Viscosity at 210° F. | 77 seconds and lower. |
| Aniline point | about 90°. |

These distillates have drying properties especially in the presence of metallic driers.

Another product of this nature is the polymer obtained by the treatment of cracked vapor phase gasoline with boron fluoride or similar polymerizing agents. It is likewise preferable to add a drier, such as cobalt naphthenate, magnesium linoleate, lead soap, and cobalt sulfonate, etc. Lead soaps of high boiling acids formed by oxidizing viscous petroleum lubricating oils or waxes are satisfactory driers for this purpose.

The diluent or solvent used with this composition is a volatile heavy petroleum naphtha, such as V. M. and P. naphtha, Stoddard solvent, etc. If it is desired to produce a non-inflammable material, the halogenated light ends of gasoline may be used. When such chlorinated products are used, it is preferred that they be steam distilled in the presence of an alkali to hydrolyze unstable chlorine atoms tending to cause corrosion.

Heretofore compositions containing wax and fatty oil in petroleum solvents were considered to be the best exterior coating compositions. One of the materials used possessed the following approximate composition:

| | Per cent |
|---|---|
| China-wood oil | 22 |
| Paraffin (122° M. P.) | 13 |
| Japan drier | 0.1 |
| Naphtha solvent | 64.9 |

This composition (No. 2) was tried among others in weathering tests to determine the comparative effectiveness of the compositions prepared according to this invention.

The tests were carried out as follows:

A number of building bricks of uniform size and weight were dried at 150° F. to constant weight. They were then immersed individually in water for ½ hour, drained for ½ minute and weighed, the difference being the total water generally absorbed by the brick; hereafter this is to be termed as the blank. These bricks were again dried to constant weight and immersed for 10 seconds in the various compositions to be tested, drained ½ minute, and weighed. The difference in weight in this case represents the weight of waterproofing compound absorbed by the brick.

After this operation, the bricks were exposed to atmospheric weathering on top of a building roof for 6 weeks, the faces being exposed in rotation every day. Thereafter the exposed bricks were again weighed, the difference (after allowing for loss of solvent by evaporation) being the amount of moisture absorbed during weathering. These bricks were again immersed in water for ½ hour, drained for ½ minute, and weighed, the difference representing the amount of water necessary to saturate the bricks.

The overall performance index arrived at took into consideration the moisture absorbed during weathering as well as the porosity (or water absorption) after weathering calculated on a unit weight of dried waterproofing compound left in the brick. Check runs were carried out on each composition, and average results are reported herein.

The following are the results of the tests:

Example 1

A composition containing 65% Varsol (naphtha solvent), 22% China-wood oil, and 13% paraffin (122° M. P.) was subjected to the above test and its general performance index was set at a value of 1. The results of all other compositions are compared with this as a standard.

Example 2

The same composition as shown in Example 1 with the addition of 0.1% Japan drier showed a general performance index of 0.9.

Example 3

A mixture of 65% naphtha, 13% paraffin (122° M. P.) and 22% cracking coil tar, together with 0.1% Japan drier, tried out according to the above test gave a general performance index of 1.5. Compared with the standard in Example 1, this composition is 50% more resistant to weathering action.

Example 4

Since the mixture in Example 3 caused a slight darkening of the brick the amount of cracking coil tar was reduced to 15% and 15% of petrolatum was substituted for the paraffin wax. This product did not discolor the brick. Weathering properties were similar to those found in Example 3.

Example 5

A non-inflammable composition containing 15% petrolatum, 15% cracking coil tar, 0.1% Japanese drier, 10% rosin, and the residue being chlorinated gasoline, was tried out in the above tests and found to give a general performance index of 1.4.

Example 6

A satisfactory composition for weatherproofing exterior building materials, concrete, etc. comprises the following:

|  | Per cent |
|---|---|
| Naphtha | 64.9 |
| Petrolatum | 15 |
| Cracking coil tar | 15 |
| Polymerized (isobutylene (mol. wt. about 15,000) | 2 |
| Lead soaps of acids obtained by oxidation of lubricating oils | 0.1 |

Example 7

The following composition was found to give satisfactory waterproofing (general performance index of 1.3), although slight discoloration was observed:

|  | Per cent |
|---|---|
| Naphtha | 64.9 |
| China-wood oil | 4 |
| Petrolatum | 2 |
| Cracking coil tar | 12 |
| Japan drier | 0.1 |
| Polymerized vapor phase cracked gasoline | 17 |

In order to prevent this discoloration, it was found preferable to maintain the total cracking coil tar-polymerized gasoline content to below 20%, preferably 15%.

It has likewise been established that the amount of chlorinated gasoline should be kept below 25%, preferably 20% in order to prevent hardening of the whole composition into a solid mass.

From the above examples, it is apparent that a 100% petroleum composition can be produced having weatherproofing properties superior to those obtained by paraffin blends. It is also shown that although high concentrations of cracking coil tar give a slight discoloration of the treated brick, no such effect is observed if the amount of tar is maintained at not over about 15% of the total composition. Furthermore, it is possible to obtain better results by the substitution of petrolatum for paraffin wax in many cases.

The coating composition may be applied by painting with a brush, spraying, etc.

The foregoing description is merely illustrative and alternate compositions may be made within the scope of the appended claim, in which it is our intention to claim all novelty as broadly as the prior art permits.

We claim:

A waterproofing compound for building materials composed of paraffin wax, 10% to 20% drying petroleum oil obtained by cracking a petroleum oil at a temperature of about 700° to 1200° F., 0.1% paint drier, and approximately 65% heavy naphtha.

EMILE L. BALDESCHWIELER.
PETER J. WIEZEVICH.